United States Patent
Liu

(10) Patent No.: US 12,485,897 B2
(45) Date of Patent: Dec. 2, 2025

(54) METHOD FOR DETERMINING PASSAGE OF AUTONOMOUS VEHICLE AND RELATED DEVICE

(71) Applicant: BEIJING JINGDONG QIANSHI TECHNOLOGY CO., LTD., Beijing (CN)

(72) Inventor: Jiangjiang Liu, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 107 days.

(21) Appl. No.: 17/759,375

(22) PCT Filed: Dec. 31, 2020

(86) PCT No.: PCT/CN2020/142232
§ 371 (c)(1),
(2) Date: Jul. 24, 2022

(87) PCT Pub. No.: WO2021/190067
PCT Pub. Date: Sep. 30, 2021

(65) Prior Publication Data
US 2023/0062074 A1    Mar. 2, 2023

(30) Foreign Application Priority Data
Mar. 24, 2020    (CN) .......................... 202010214755.7

(51) Int. Cl.
*B60W 30/18*        (2012.01)
*B60W 60/00*        (2020.01)

(52) U.S. Cl.
CPC .. *B60W 30/18159* (2020.02); *B60W 60/0027* (2020.02); *B60W 2552/05* (2020.02);
(Continued)

(58) Field of Classification Search
CPC ....... B60W 30/18159; B60W 60/0027; B60W 2556/10; B60W 2554/4044; B60W 2555/60; B60W 2552/05; B60W 2552/10
See application file for complete search history.

(56) References Cited

U.S. PATENT DOCUMENTS

2011/0125402 A1    5/2011    Mitsugi et al.
2015/0329107 A1    11/2015   Meyer et al.
(Continued)

FOREIGN PATENT DOCUMENTS

CN    106218637 A    12/2016
CN    107560622 A    1/2018
(Continued)

OTHER PUBLICATIONS

Kun, CN109801508A_Translated, 2019.*
(Continued)

*Primary Examiner* — Erin D Bishop
*Assistant Examiner* — Shivam Sharma
(74) *Attorney, Agent, or Firm* — Qinghong Xu

(57) ABSTRACT

A method for determining passage of an autonomous vehicle includes: acquiring information about an intersection on a driving route of the autonomous vehicle, wherein the information about the intersection comprises lane data; acquiring a historical trajectory of an obstacle in the intersection within a specific time; acquiring, by matching the historical trajectory of the obstacle with center lines of respective lanes in the lane data, a lane with smallest matching error; and determining that the lane with the smallest matching error is in a passable state, wherein the lane with the smallest matching error is a lane where the obstacle is located.

15 Claims, 7 Drawing Sheets

(52) U.S. Cl.
CPC . *B60W 2552/10* (2020.02); *B60W 2554/4044* (2020.02); *B60W 2555/60* (2020.02); *B60W 2556/10* (2020.02)

(56) References Cited

U.S. PATENT DOCUMENTS

| | | | |
|---|---|---|---|
| 2016/0347322 | A1 | 12/2016 | Clarke |
| 2017/0038773 | A1 | 2/2017 | Gordon et al. |
| 2017/0241794 | A1 | 8/2017 | Koo et al. |
| 2018/0370530 | A1 | 12/2018 | Ishikawa |
| 2019/0197902 | A1 | 6/2019 | Shin et al. |
| 2020/0047751 | A1 | 2/2020 | Hwu et al. |

FOREIGN PATENT DOCUMENTS

| | | | | | |
|---|---|---|---|---|---|
| CN | 107813830 | A | | 3/2018 | |
| CN | 109801508 | A | * | 5/2019 | ...... B60W 30/18159 |
| CN | 109878515 | A | | 6/2019 | |
| CN | 109949590 | A | | 6/2019 | |
| CN | 110171414 | A | | 8/2019 | |
| CN | 110377029 | A | | 10/2019 | |
| CN | 110395252 | A | | 11/2019 | |
| CN | 110648526 | A | | 1/2020 | |
| CN | 110827575 | A | | 2/2020 | |
| CN | 110889965 | A | | 3/2020 | |
| CN | 111422204 | A | | 7/2020 | |
| DK | 201970221 | A1 | | 8/2020 | |
| EP | 3407328 | A1 | * | 11/2018 | ............... G08G 1/16 |
| IN | 110660256 | A | | 1/2020 | |
| JP | 2008065480 | A | | 3/2008 | |
| JP | 2010271162 | A | | 12/2010 | |
| JP | 2017045272 | A | | 3/2017 | |
| JP | 2017132332 | A | * | 8/2017 | |
| JP | WO2019030916 | A1 | | 10/2020 | |
| JP | WO2019146052 | A1 | | 12/2020 | |
| KR | 20190016690 | A | | 2/2019 | |
| KR | 1020190078824 | A | | 7/2019 | |

OTHER PUBLICATIONS

Junichi, JP2017132332A_Translated, 2017.*
International Search Report dated Apr. 1, 2021 of PCT International Application No. PCT/CN2020/142232.
The First Office Action dated Feb. 2, 2021 of Chinese Patent No. 202010214755.7.
The Second Office Action dated Aug. 4, 2021 of Chinese Patent No. 202010214755.7.
1st Office Action dated Aug. 22, 2023 of Japanese Application No. 2022-543782.
Extended European Search Report dated Jun. 2, 2023 of Europe Application No. 20927925.6.
1st Office Action dated Apr. 22, 2024 for Korean Application No. 10-2022-7024935.
Notice of Allowance dated Aug. 26, 2025 of Korean Application No. 10-2022-7024935.

* cited by examiner

METHOD FOR DETERMINING PASSAGE OF AUTONOMOUS VEHICLE AND RELATED DEVICE

CROSS-REFERENCES TO RELATED APPLICATIONS

This disclosure is an US national phase of International Application No. PCT/CN2020/142232, filed on Dec. 31, 2020, which claims the priority of a Chinese patent application No. 202010214755.7, filed Mar. 24, 2020 and titled "METHOD FOR DETERMINING PASSAGE OF AUTONOMOUS VEHICLE AND RELATED DEVICE", the entire content of both of which is incorporated herein by reference.

TECHNICAL FIELD

The disclosure relates to the field of computer and communication technologies, and in particular, to a method and an apparatus for determining the passage of an autonomous vehicle, a computer-readable storage medium, and an electronic device.

BACKGROUND

Typically, when an autonomous vehicle determines the state of the traffic light in its travel direction, it needs to collect the state of multiple traffic lights at the intersection, and then determines the state of the traffic light in its travel direction based on the logical relationship between the multiple traffic lights and the perception results.

It should be noted that the information disclosed in the background section is only used to enhance the understanding of the background of the disclosure, and therefore may include information that does not constitute the prior art known to those of ordinary skill in the art.

SUMMARY

Embodiments of the disclosure provide a method and an apparatus for determining passage of an autonomous vehicle, a computer-readable storage medium, and an electronic device, thereby determining passage condition of the autonomous vehicle on its driving route.

Other characteristics and advantages of the disclosure will become apparent through the following detailed description, or partly learned through implementation of the disclosure.

According to an aspect of the disclosure, there is provided a method for determining passage of an autonomous vehicle, including:
  acquiring information about an intersection on a driving route of the autonomous vehicle, wherein the information about the intersection includes lane data;
  acquiring a historical trajectory of an obstacle in the intersection within a specific time;
  acquiring, by matching the historical trajectory of the obstacle with center lines of respective lanes in the lane data, a lane with smallest matching error; and
  determining that the lane with the smallest matching error is in a passable state;
  wherein the lane with the smallest matching error is a lane where the obstacle is located.

In some embodiments, the information about the intersection further includes traffic lights corresponding to the lane data, and the determining that the lane with the smallest matching error is in the passable state includes:
  determining that a traffic light corresponding to the lane with the smallest matching error indicates the passable state.

In some embodiments, the method further includes:
  acquiring a state of a traffic light on the driving route of the autonomous vehicle;
  verifying, when the traffic light corresponding to the lane with the smallest matching error is the traffic light on the driving route of the autonomous vehicle, whether the traffic light on the driving route of the autonomous vehicle is in the passable state; or
  verifying, when the traffic light corresponding to the lane with the smallest matching error is not the traffic light on the driving route of the autonomous vehicle, whether the traffic light on the driving route of the autonomous vehicle is in the passable state according to logical relationship between traffic lights at the intersection.

In some embodiments, the acquiring the historical trajectory of the obstacle in the intersection within the specific time includes:
  tracking historical trajectory points of the obstacle through a control algorithm, and determining an obtained tracking trajectory as the historical trajectory of the obstacle;
  wherein an interpolation is performed on the historical trajectory, and the historical trajectory includes coordinates and orientations of respective interpolated points, and an orientation of an interpolated point is a moving direction of the obstacle.

In some embodiments, the acquiring, by matching the historical trajectory of the obstacle with center lines of respective lanes in the lane data, the lane with smallest matching error includes:
  acquiring, by matching a shape and an orientation of the historical trajectory of the obstacle with a shape and an extension direction of the center lines of respective lanes in the lane data, the lane with the smallest matching error;
  wherein an interpolation is performed on the center lines of respective lanes, and a center line of a lane includes coordinates and orientations of respective interpolated points.

In some embodiments, the acquiring, by matching the historical trajectory of the obstacle with center lines of respective lanes in the lane data, the lane with smallest matching error includes:
  acquiring, by matching the historical trajectory of the obstacle with the center lines of respective lanes in the lane data through a curve similarity matching algorithm, the lane with the smallest matching error.

In some embodiments, an interpolation is performed on the historical trajectory, and the historical trajectory includes coordinates and orientations of respective interpolated points, and an orientation of an interpolated point is a moving direction of the obstacle; another interpolation is performed on the center lines of respective lanes, and a center line of a lane includes coordinates and orientations of respective interpolated points; and the acquiring, by matching the historical trajectory of the obstacle with the center lines of respective lanes in the lane data through the curve similarity matching algorithm, the lane with the smallest matching error includes:
  calculating a distance from each interpolated point of the historical trajectory to a nearest interpolated point on the center lines of respective lanes in the lane data, and calculating an orientation difference between each interpolated point of the historical trajectory and the nearest interpolated point on the center lines of respective lanes in the lane data;

calculating a sum of absolute values of the distance and the orientation difference between the historical trajectory and the center lines of respective lanes in the lane data; and determining a lane with a smallest sum of the absolute values in the lane data as the lane with the smallest matching error;

wherein, the orientation difference is an angle between an orientation of an interpolated point of the historical trajectory and an orientation of an interpolated point of a center line of a lane.

In some embodiments, the information about the intersection further includes a polygon formed by sequentially connecting cut-off lines of respective lanes, and the acquiring the historical trajectory of the obstacle in the intersection within the specific time includes:

acquiring the historical trajectory of the obstacle in the intersection within the specific time and within the polygon.

In some embodiments, the method further includes:

determining, when there are multiple obstacles and a logical contradiction exists between states of traffic lights at the intersection, that a traffic light corresponding to a largest number of obstacles is in the passable state.

According to another aspect of the disclosure, there is provided an apparatus for determining passage of an autonomous vehicle, including:

an acquiring module, configured to acquire information about an intersection on a driving route of the autonomous vehicle and a historical trajectory of an obstacle in the intersection within a specific time, wherein the information about the intersection includes lane data;

a matching module, configured to acquire, by matching the historical trajectory of the obstacle with center lines of respective lanes in the lane data, a lane with smallest matching error; and a determining module, configured to determine that the lane with the smallest matching error is in a passable state; wherein the lane with the smallest matching error is a lane where the obstacle is located.

According to yet another aspect of the disclosure, there is provided an electronic device, including:

one or more processors; and a memory, configured to store one or more programs, and the one or more programs are used for, when being executed by the one or more processors, causing the one or more processors to implement the method according to any embodiments as described above.

According to still another aspect of the disclosure, there is provided a computer-readable storage medium storing a computer program, wherein the computer program is used for, when being executed by a processor, implementing the method according to any embodiments as described above.

According to the disclosure, a corresponding lane where an obstacle in the intersection is located is acquired through a moving trajectory of the obstacle, so that the passable state of the lane can be determined.

It should be understood that the above general description and the following detailed description are only exemplary and explanatory without limiting the disclosure.

BRIEF DESCRIPTION OF THE DRAWINGS

The drawings herein are incorporated into the specification and constitute a part of the specification, illustrate embodiments consistent with the disclosure, and are used together with the specification to explain the principle of the disclosure. Obviously, the drawings in the following description are only some embodiments of the disclosure. For those of ordinary skill in the art, other drawings can be obtained based on these drawings without creative work. In the drawings.

DETAILED DESCRIPTION

Figure 1:
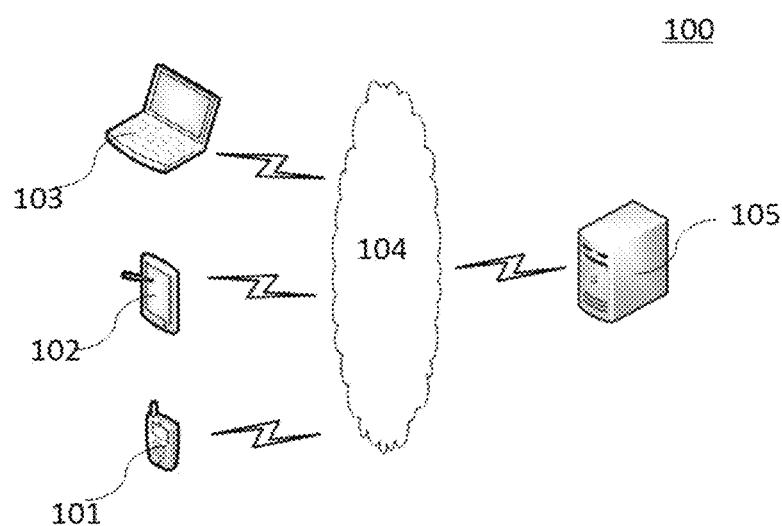
FIG. 1 shows a schematic diagram of an exemplary system architecture in which the method or apparatus for determining passage of the autonomous vehicle according to some embodiments of the disclosure can be applied.

Exemplary embodiments will now be described more fully with reference to the accompanying drawings. However, the exemplary embodiments can be implemented in various forms, and should not be construed as being limited to the examples set forth herein. Rather, these embodiments are provided so that the disclosure will be more comprehensive and complete, and the concept of the example embodiments will be fully conveyed to those skilled in the art.

In addition, the described features, structures, or characteristics can be combined in one or more embodiments in any suitable manner. In the following description, many specific details are provided to give a sufficient understanding of the embodiments of the disclosure. However, those skilled in the art will realize that the technical solutions of the disclosure can be practiced without one or more of the specific details. Alternatively, other methods, components, devices, steps, and the like can be used. In other cases, well-known methods, devices, implementations or operations are not shown or described in detail in order to avoid obscuring various aspects of the disclosure.

The block diagrams shown in the drawings are merely functional entities, and do not necessarily correspond to physically independent entities. In other words, these functional entities can be implemented in the form of software, or implemented in one or more hardware modules or integrated circuits, or implemented in different networks and/or processors and/or microcontroller devices.

The flowchart shown in the drawings is only an exemplary description, and does not necessarily include all contents and operations/steps, nor does it have to be performed in the described order. For example, some operations/steps can be decomposed, and some operations/steps can be combined or partially combined, so the actual execution order may be changed according to actual conditions.

FIG. 1 shows a schematic diagram of an exemplary system architecture 100 in which the method or apparatus for determining passage of the autonomous vehicle according to some embodiments of the disclosure can be applied.

As shown in FIG. 1, the system architecture 100 may include one or more of terminal devices 101, 102, 103, a network 104 and a server 105. The network 104 is a medium used to provide a communication link between the terminal devices 101, 102, 103 and the server 105. The network 104 may include various connection types, such as wired, wireless communication links, or fiber optic cables, and so on.

It should be understood that the numbers of terminal devices, networks, and servers in FIG. 1 are merely illustrative. There can be any number of terminal devices, networks, and servers according to implementation needs. For example, the server 105 may be a server cluster composed of multiple servers.

The autonomous vehicle may interact with the server 105 by using the terminal devices 101, 102, 103 through the network 104 to receive or send messages and so on. The terminal devices 101, 102, 103 may be various electronic devices with display screens, including but not limited to smart phones, tablet computers, portable computers, desktop computers, digital movie projectors, and so on.

The server 105 may be a server that provides various services. For example, the autonomous vehicle sends, through the terminal device 103 (or the terminal device 101 or 102), a passability determination request of the autonomous vehicle to the server 105. Alternatively, the terminal device 103 automatically sends the passability determination request of the autonomous vehicle to the server 105 in real time. The server 105 may acquire information about an intersection on the driving route of the autonomous vehicle based on the passability determination request of the autonomous vehicle, where the information about the intersection includes lane data; acquire a historical trajectory of an obstacle in the intersection within a specific time and within the intersection; acquire, by matching the historical trajectory of the obstacle with center lines of respective lanes in the lane data, a lane with smallest matching error; and determine that the lane with the smallest matching error is in a passable state; where the lane with the smallest matching error is the lane where the obstacle is located.

For another example, the terminal device 103 (or terminal device 101 or 102) may be a smart TV, VR (Virtual Reality)/AR (Augmented Reality) head-mounted display, a mobile terminal installed with applications (apps) including navigation app, online car-hailing app, instant messaging app, video app and the like, such as smart phones and tablet computers. The autonomous vehicles may send, through the smart TV, the VR/AR head-mounted display, the navigation app, the online car-hailing app, the instant messaging app, or the video app, the determination request of the autonomous vehicle to the server 105. The server 105 may obtain a corresponding passability determination result of the autonomous vehicle based on the determination request of the autonomous vehicle, and return the corresponding passability determination result of the autonomous vehicle to the smart TV, the VR/AR head-mounted display, the navigation app, the online car-hailing app, the instant messaging app, or the video app, and then display the passability determination result of the autonomous vehicle through the smart TV, the VR/AR head-mounted display, the navigation app, the online car-hailing app, the instant messaging app, or the video app.

Figure 2:
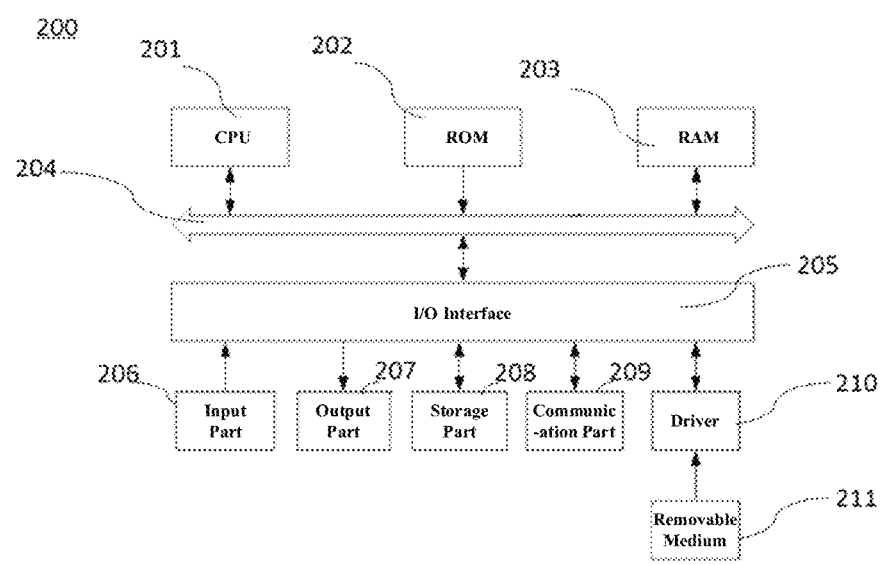
FIG. 2 shows a block diagram of a computer system suitable for implementing the electronic device according to some embodiments of the disclosure.

FIG. 2 shows a block diagram of a computer system suitable for implementing an electronic device according to some embodiments of the disclosure.

It should be noted that the computer system 200 of the electronic device shown in FIG. 2 is only an example, and should not bring any limitation to the functions and usage scope of embodiments of the disclosure.

As shown in FIG. 2, the computer system 200 includes a central processing unit (CPU) 201, which may execute various appropriate actions and processing according to a program stored in a read-only memory (ROM) 202 or a program loaded from a storage part 208 to a random access memory (RAM) 203. In RAM 203, various programs and data required for system operation may be also stored. The CPU 201, ROM 202, and RAM 203 are connected to each other through a bus 204. An input/output (I/O) interface 205 is also connected to the bus 204.

The following components are connected to the I/O interface 205: an input part 206 including keyboard, mouse, and the like; an output part 207 including cathode ray tube (CRT), liquid crystal display (LCD), and speaker; a storage part 208 including a hard disk and the like; and a communication part 209 including a network interface card such as a local area network (LAN) card, a modem and the like. The communication part 209 performs communication processing via a network such as the Internet. The drive 210 may be also connected to the I/O interface 205 as needed. The removable medium 211, such as a magnetic disk, an optical disk, a magneto-optical disk, a semiconductor memory, and the like, is installed on the drive 210 as needed, so that the computer program read from it can be installed into the storage part 208 as needed.

According to some embodiments of the disclosure, the process described below with reference to a flowchart may be implemented as a computer software program. For example, the embodiments of the disclosure include a computer program product, which includes a computer program carried on a computer-readable storage medium, and the computer program contains program code for executing the method shown in the flowchart. In some embodiments, the computer program may be downloaded and installed from the network through the communication part 209, and/or installed from the removable medium 211. When the computer program is executed by the CPU 201, various functions defined in the method and/or device of the application can be implemented.

It should be noted that the computer-readable storage medium shown in the disclosure may be a computer-readable signal medium or a computer-readable storage medium, or any combination of the two. The computer-readable storage medium may be, for example, but is not limited to, an electrical, magnetic, optical, electromagnetic, infrared, or semiconductor system, apparatus, device, or a combination of any of the above. More specific examples of computer-readable storage medium may include, but are not limited to electrical connections with one or more wires, portable computer disks, hard disks, RAM, ROM, erasable removable programmable read-only memory (EPROM), flash memory, optical fiber, portable compact disk read-only memory (CD-ROM), optical storage device, magnetic storage device, or any suitable combination of the above. In the disclosure, the computer-readable storage medium may be any tangible medium that contains or stores a program, and the program may be used by or in combination with an instruction execution system, apparatus, or device. In this disclosure, the computer-readable signal medium may include a data signal propagated in a baseband or as a part of a carrier wave, and a computer-readable program code is carried therein. This propagated data signal can take many forms, including but not limited to electromagnetic signals, optical signals, or any suitable combination of the foregoing. The computer-readable signal medium may also be any computer-readable storage medium other than the computer-readable storage medium. The computer-readable storage medium may be used for sending, propagating, or transmitting a program used by or in combination with an instruction execution system, apparatus, or device. The program code contained on the computer-readable storage medium may be transmitted via any suitable medium, including but not limited to wireless medium, wire, optical cable, radio frequency (RF) medium, or any suitable combination of the foregoing.

The flowcharts and block diagrams in the drawings illustrate the possible implementation architecture, functions, and operations of methods, devices, and computer program products according to various embodiments of the disclosure. In this regard, each block in the flowchart or block diagram may represent a module, program segment, or part of the code, and the above-mentioned module, program segment, or part of the code contains one or more executable instructions for realizing specified logic functions. It should also be noted that, in some alternative implementations, the functions marked in the block may also occur in a different order from the order marked in the drawings. For example, two blocks shown one after another may actually be executed substantially in parallel, and they may sometimes be executed in a reverse order, depending on the functions involved. It should also be noted that each block in the block diagram or flowchart, and the combination of blocks in the block diagram or flowchart, may be implemented by a dedicated hardware-based system that performs the specified function or operation, or may be implemented by a combination of dedicated hardware and computer instructions.

The modules and/or units and/or sub-units involved in the described embodiments of the disclosure may be implemented in software or hardware. The described modules and/or units and/or sub-units may also be provided in the processor. In some embodiments, the names of these modules and/or units and/or subunits do not constitute a limitation on the modules and/or units and/or subunits themselves under certain circumstances.

As another aspect, the present application also provides a computer-readable storage medium. The computer-readable storage medium may be included in the electronic device described in the above-mentioned embodiments; or it may exist alone without being assembled into the electronic device. The foregoing computer-readable storage medium carries one or more programs, and when the foregoing one or more programs are executed by the electronic device, the electronic device realizes the method described in the following embodiments. For example, the electronic device may implement the steps shown in FIG. 3.

In related art, for example, machine learning methods, deep learning methods, and the like may be used to determine the passage of autonomous vehicles, and different methods have different applicable ranges.

In some embodiment, the application provides a method for determining passage of an autonomous vehicle, which includes: acquiring information about an intersection on a driving route of the autonomous vehicle, wherein the information about the intersection (also referred to as intersection information below) includes lane data; acquiring a historical trajectory of an obstacle in the intersection within a specific time; acquiring, by matching the historical trajectory of the obstacle with center lines of respective lanes in the lane data, a lane with smallest matching error; and determining that the lane with the smallest matching error is in a passable state; wherein the lane with the smallest matching error is a lane where the obstacle is located.

In some embodiments, the intersection information further includes traffic lights corresponding to the lane data, and the determining that the lane with the smallest matching error is in the passable state includes: determining that a traffic light corresponding to the lane with the smallest matching error indicates the passable state.

Figure 3:
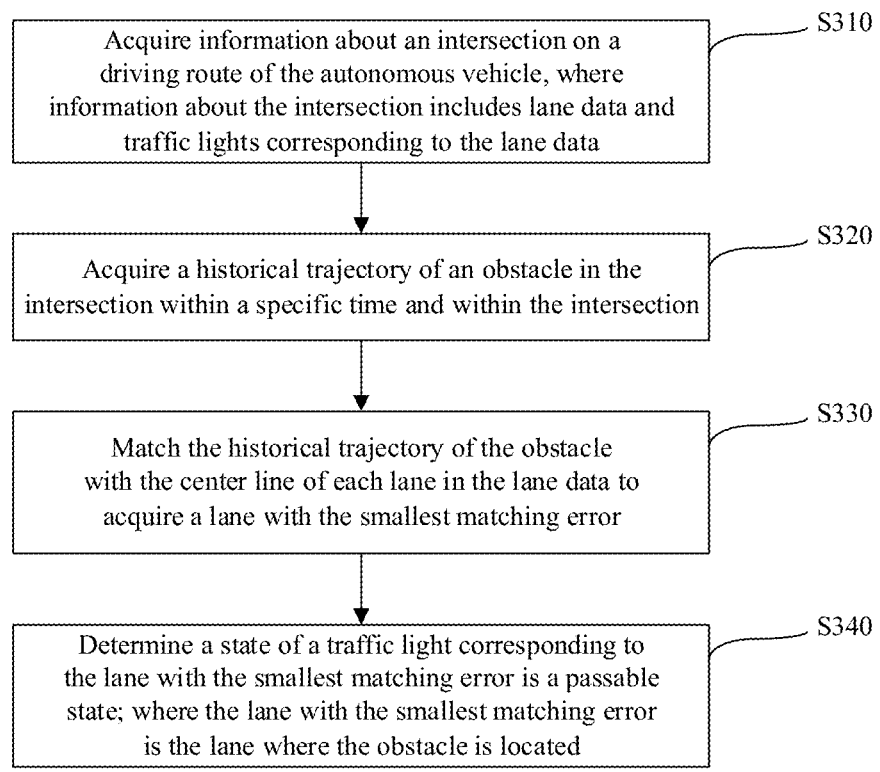
FIG. 3 schematically shows a flowchart of the method for determining passage of the autonomous vehicle according to some embodiments of the disclosure.

FIG. 3 schematically shows a flowchart of the method for determining passage of the autonomous vehicle according to some embodiments of the disclosure. The method steps of the embodiments of the disclosure may be executed by the terminal device, or by the server, or executed by the terminal device and the server interactively. For example, they may be executed by the server 105 in FIG. 1 as described above, but the disclosure is not limited thereto.

In step S310, information about an intersection on a driving route of the autonomous vehicle is acquired, where information about the intersection includes lane data and traffic lights corresponding to the lane data.

In this step, the terminal or the server acquires information about the intersection on the driving route of the autonomous vehicle, where the information about the intersection includes lane data and traffic lights corresponding to the lane data. In some embodiments, the terminal or the server may acquire, through an electronic map or navigation software, the information about the intersection on the driving route of the autonomous vehicle, that is, the information about the intersection that needs to be passed on the driving route of the autonomous vehicle. In some embodiments, the intersection information includes lane data and traffic lights corresponding to the lane data. The lane data includes, for example, the number, distribution, and directions of lanes at the intersection, and the traffic lights corresponding to the lane data include traffic lights controlling the lanes, the traffic lights that control the lanes may be queried through the lanes.

In step S320, a historical trajectory of an obstacle in the intersection within a specific time and within the intersection is acquired.

In this step, the terminal or the server acquires the historical trajectory of the obstacle in the intersection within a specific time and within the intersection. In some embodiments, the terminal or the server may acquire the historical trajectory of the obstacle in the intersection within the specific time and within the intersection through a tool such as satellite positioning. In some embodiments, the obstacle may be a vehicle or a pedestrian. In some embodiments, the specific time may be 3 seconds. In some embodiments, the historical trajectory may be a movement trajectory of the obstacle in the intersection within 3 seconds. In some embodiments, a control algorithm is used to track the historical trajectory points of the obstacle, and the obtained tracking trajectory is used as the historical trajectory of the obstacle; wherein an interpolation is performed on the historical trajectory, and the historical trajectory includes coordinates and orientations of respective interpolated points, and an orientation of an interpolated point is a moving direction of the obstacle. In some embodiments, the control algorithm may be a model predictive control (MPC) algorithm or a pure pursuit (PP) control algorithm. In some embodiments, the historical trajectory points of the obstacle may be formed by the geometric center point of the obstacle.

In some embodiments, the intersection information further includes a polygon formed by sequentially connecting cut-off lines of respective lanes, and acquiring of the historical trajectory of the obstacle in the intersection within the specific time and within the intersection includes: acquiring the historical trajectory of the obstacle within the specific time and within the polygon.

In step S330, the historical trajectory of the obstacle is matched with the center line of each lane in the lane data to acquire a lane with the smallest matching error.

In this step, the terminal or the server matches the historical trajectory of the obstacle with the center line of each lane in the lane data to acquire the lane with the smallest matching error. In some embodiments, matching of the historical trajectory of the obstacle with the centerline of each lane in the lane data to acquire the lane with the smallest matching error includes: acquiring, by matching a shape and an orientation of the historical trajectory of the obstacle with a shape and an extension direction of the center lines of respective lanes in the lane data, the lane with the smallest matching error; wherein an interpolation is performed on the center lines of respective lanes, and a center line of a lane includes coordinates and orientations of respective interpolated points. In this step, by comparing the movement trajectory of the obstacle with the trajectory of the center line of the lane, it is determined that the obstacle is traveling or moving on that lane. In some embodiments, a curve similarity matching algorithm is used to match the historical trajectory of the obstacle with the center line of each lane in the lane data to acquire the lane with the smallest matching error.

In step S340, it is determined that a state of a traffic light corresponding to the lane with the smallest matching error is a passable state; wherein the lane with the smallest matching error is the lane where the obstacle is located.

In this step, after matching the historical trajectory of the obstacle with the center line of each lane in the lane data to acquire the lane with the smallest matching error, the terminal or the server determines that the state of the traffic light corresponding to the lane with the smallest matching error is the passable state; wherein the lane with the smallest matching error is the lane where the obstacle is located. In this step, since there is obstacle moving on the lane of the intersection, it indicates that the obstacle is allowed to move on that lane, so it is determined that the traffic light controlling the lane is in the passable state.

In some embodiments, the method shown in FIG. 3 further includes the following steps: acquiring a state of a traffic light on the driving route of the autonomous vehicle; verifying, when the traffic light corresponding to the lane with the smallest matching error is the traffic light on the driving route of the autonomous vehicle, the state of the traffic light on the driving route of the autonomous vehicle; or verifying, when the traffic light corresponding to the lane with the smallest matching error is not the traffic light on the driving route of the autonomous vehicle, the state of the traffic light on the driving route of the autonomous vehicle according to logical relationship between traffic lights at the intersection. In this embodiment, the state of the traffic light on the driving route of the vehicle as directly acquired is verified based on the state of the traffic light determined in FIG. 3.

In some embodiments, when there are multiple obstacles, if there is a logical contradiction between the states of the traffic lights at the intersection, it is determined that a traffic light corresponding to the largest number of obstacles is in the passable state. This embodiment is mainly used to eliminate misjudgments caused by illegal driving or walking of vehicles or pedestrians at the intersection.

In some embodiments, the application includes a map module, a perception module, and a navigation module.

The map module provides information including but not limited to traffic light information, lane information, intersection information and query interfaces corresponding to the information. Specifically, the traffic light information includes, but is not limited to, identifiers and lane pairs bound thereto. It should be noted that a traffic light may be bound to multiple lane pairs. Through the query interface provided by the map module, the lane pair bound to the traffic light can be queried according to the current traffic light, and the traffic light can be queried according to the lane pair. The lane information includes, but is not limited to, the upstream lane and downstream lane of the current lane. There may be multiple upstream and downstream lanes (one-to-more, or more-to-one). Lane types include, but is not limited to, motorized lanes, non-motorized lanes, crosswalks, and the like. The lane information may also include a coordinate set of the lane center line (a sequence of coordinate points, which indicates the driving direction of the lane), At the same time, through the query interface as provided, all information of the lane can be obtained according to the current lane. The intersection information includes, but is not limited to, the outline information (a sequence of coordinate points) of the intersection. In the disclosure, it may be required that the outline of the intersection is a convex polygon.

The perception module provides information about obstacles and traffic lights. The obstacle information includes, but is not limited to, the length, width, height, speed, orientation, center point coordinates, and historical trajectory points for a time period (a collection of coordinate points that increase in time) of the obstacle. The traffic light state information includes, but is not limited to, the state (red, yellow, green, unknown), geographic location, and the like of the current traffic light.

The navigation module provides a sequence of lanes that the vehicle needs to travel (a collection of lanes with a sequence).

In some embodiments, the states of all traffic lights determined based on the lane with the smallest matching error are added to a decision set D.

In some embodiments, it is determined whether a corresponding identification code of the traffic light is consistent with an identification code of the traffic light generated by the perception module. If they are inconsistent, it is considered that the generated data of the perception is incorrect, verification of the identification code fails, and its state is marked as "verification fails". It is then determined whether the traffic light is in the set D, if not, it is added to the set D, and the state of the traffic light remains unchanged. If the traffic light is in the set D, it is determined whether the generated state of the perception is consistent with the state of the traffic light in the set D and, if yes, the state verification is considered to be successful. If they are inconsistent, the state of the traffic light in the set D is changed to the state generated by the perception module (in other words, the generated state of the perception is mainly relied on), and its state is marked as "verification fails". Finally, according to the disclosure, the data set D may be sent to other modules (such as prediction, path, speed planning, and the like).

In some embodiments, a distance from each interpolated point of the historical trajectory to a nearest interpolated point on the center lines of respective lanes in the lane data is calculated, and an orientation difference between each interpolated point of the historical trajectory and the nearest interpolated point on the center lines of respective lanes in the lane data is calculated. Then a sum of absolute values of the distance and the orientation difference between the historical trajectory and the center lines of respective lanes in the lane data is calculated; and a lane with a smallest sum of the absolute values in the lane data is determined as the lane with the smallest matching error. Herein, the orientation difference may be an angle between an orientation of an interpolated point of the historical trajectory and an orientation of an interpolated point of a center line of a lane.

In some embodiments, a first lane is taken as an example below.

For each trajectory point on the historical trajectory (i.e., each interpolated point of the historical trajectory), a point (i.e., an interpolated point of the lane centerline) closest to the trajectory point is determined on the first lane. If the absolute value of the orientation difference therebetween is greater than 1.57, this matching fails, and the similarity is positive infinity (+∞).

Otherwise, the distance D and the orientation difference AngleDiff (the angle between the two points, normalized to −3.14 to 3.14) between the two points are calculated, and the sum of the absolute values of the distance D and the orientation difference is calculated as the similarity of the two points.

The similarity between the historical trajectory and the first lane is derived through dividing the sum of the similarities between each trajectory point on the historical trajectory and the first lane by the number of trajectory points taken on the historical trajectory.

Finally, the lane with the smallest similarity to the historical trajectory is selected from the lane set as the lane where the obstacle is located. In some embodiments, pseudo codes of the curve similarity matching algorithm may be as follows:

1. initialize Error as 0;
2. for each point P1 on curve 1:
   a) query a point P2 on curve 2 closest to point P1, and calculate a distance D therebetween;
   b) calculate the orientation difference AngleDiff between P1 and P2, normalize it to the range of −180° to 180°, and convert it to a radian value;
   c) if the absolute value of AngleDiff is greater than 1.57 (pi/2), the match fails and ends;
   d) Error=Error+D+AngleDiff;
3. return (Error/the number of points on curve 1).

In some embodiments, curve 1 is the trajectory of the obstacle (after interpolation, with orientation), and curve 2 is a string of points on the center line of the lane (after interpolation, with orientation).

According to the disclosure, the corresponding lane where the obstacle in the intersection is located is acquired through the moving trajectory of the obstacle, so that the passable state of the lane can be determined.

Figure 4:
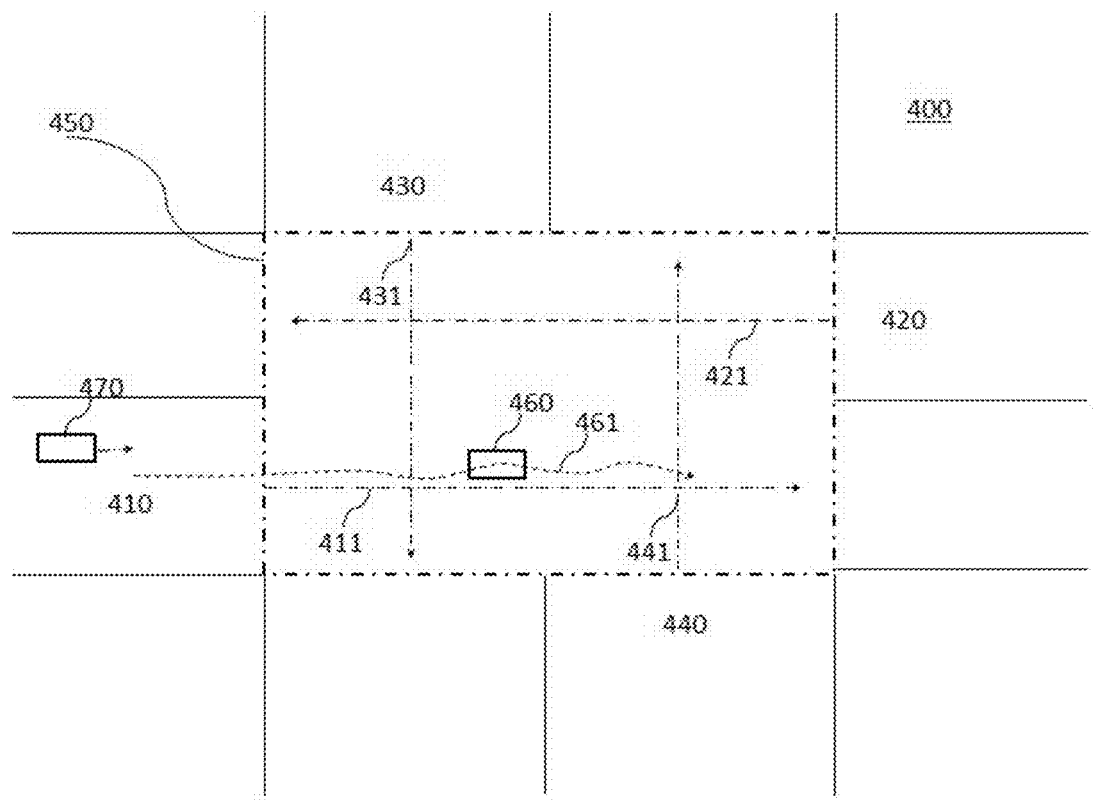
FIG. 4 is a schematic diagram of an intersection according to some embodiments of the disclosure.

FIG. 4 is a schematic diagram of an intersection 400 according to some embodiments of the disclosure. As shown in FIG. 4, the intersection 400 includes lanes 410, 420, 430, 440, a central area 450 of the intersection, an obstacle 460, and an autonomous vehicle 470. The lanes 410, 420, 430, and 440 respectively include center lines 411, 421, 431, and 441. The trajectory 461 is the movement trajectory of the obstacle. The arrow of the center lines 411, 421, 431, and 441 indicate the directions in which the lane allows vehicles to move.

In some embodiments, the application may be implemented through the following steps.

In step 1, based on the current position of the vehicle (e.g., the position of the autonomous vehicle 470 in FIG. 4), the intersection (e.g., the intersection shown in FIG. 4) and traffic lights closest to the vehicle ahead are queried, and it is determined whether the intersection is on the navigation path of the automatic vehicle (e.g., the autonomous vehicle 470 in FIG. 4). If not, step 5 is performed, otherwise step 2 is performed.

In step 2, a lane set S including all lanes (e.g., lanes 410, 420, 430, 440 in FIG. 4) within the intersection (e.g., the intersection 400) is obtained according to the location of the intersection, linear interpolation is perform on centerlines (e.g., the lane centerlines 421, 421, 431, 441) of respective lanes in the set S, and the orientation of every point is then calculated to obtain a lane set LP, where information of the points on the lane includes coordinates and orientation.

In step 3, the following steps 3.1 to 3.5 are performed for each obstacle (e.g., obstacle 460 in FIG. 4) that is perceived.

In step 3.1, it is determined whether the current obstacle is within the intersection, if not, the next obstacle is processed, otherwise step 3.2 is performed.

In step 3.2, the historical trajectory of the obstacle (e.g., the trajectory line 461 of the obstacle 460 in FIG. 4), and interception is performed (if the obstacle is within the intersection) to leave only a set of trajectory points within the intersection (i.e., the part of the trajectory line 461 within the intersection center area 450).

In step 3.3, linear interpolation is performed on the trajectory point set, the trajectory point set is tracked through a control algorithm such as PP or MPC, and a tracking trajectory output by the algorithm is used as the final moving trajectory of the obstacle, where information of the trajectory point includes coordinates and orientation.

In step 3.4, each curve in the set LP (e.g., the lane centerline 411, 421, 431, 441 in FIG. 4) is matched with the moving trajectory of the obstacle (e.g., the trajectory line 461 in FIG. 4) to obtain a lane centerline with the smallest matching error (e.g., lane centerline 411 in FIG. 4), where the specific matching algorithm may refer to the curve similarity matching algorithm as described above; if the moving trajectory of the obstacle fails to be matched with all the curves in the set LP, the next obstacle is processed and step 3.1 is performed, otherwise step 3.5 is performed.

In step 3.5, a set L of upstream lanes (e.g., the part of lane 410 outside the intersection center area 450 in FIG. 4) of the lane centerline (e.g., lane centerline 411 in FIG. 4) with the smallest matching error is retrieved, and it is determined whether there is a traffic light between each lane in the set L to the current lane centerline with the smallest matching error, if yes, the traffic light is marked as green and added to the decision set D; and then the next obstacle is processed and step 3.1 is performed, when there is no obstacle left, step 4 is performed.

In step 4, it is determined whether the location of the traffic light obtained in step 1 is consistent with the location of the traffic light determined by the perception module. If not, it is determined that the perceived data is incorrect, the location verification fails, and the state is marked as failed verification. If yes, it is determined whether the traffic light is in the set D, if it is not in the set D, the traffic light is added to the set D, and the state of the traffic light remains unchanged. If the traffic light is in the set D, it is determined whether the perceived state is consistent with the state of the traffic light in the set D. If they are consistent, it is determined that the state verification successes. If they are inconsistent, the state of the traffic light in the set D is changed to the state issued by the perception module (i.e., substantially depending on the state issued by the perception module), and the state is marked as failed verification. Finally, the data of set D is sent to downstream modules (e.g., prediction, path, speed planning, and the like), then step 5 is performed.

In step 5, this decision is ended.

Figure 5:
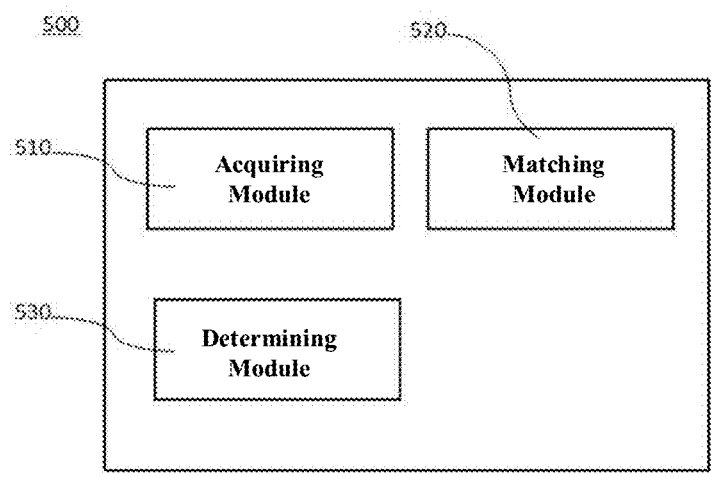
FIG. 5 schematically shows a block diagram of the apparatus for determining passage of the autonomous vehicle according to some embodiments of the disclosure.

FIG. 5 schematically shows a block diagram of the apparatus for determining passage of the autonomous vehicle according to some embodiments of the disclosure. The apparatus 500 for determining passage of the autonomous vehicle according to the embodiments of the disclosure may be provided on the terminal device, or on the server side, or partly on the terminal device and partly on the server side. For example, it may be provided on the server 105 as shown in FIG. 1, but the disclosure is not limited thereto.

The apparatus 500 for determining passage of the autonomous vehicle according to the embodiments of the disclosure may include an acquiring module 510, a matching module 520, and a determining module 530.

In some embodiments, the acquiring module 510 is configured to acquire information about an intersection on a driving route of the autonomous vehicle and a historical trajectory of an obstacle in the intersection within a specific time, where the information about the intersection includes lane data. The matching module 520 is configured to acquire, by matching the historical trajectory of the obstacle with center lines of respective lanes in the lane data, a lane with smallest matching error. The determining module 530 is configured to determine that the lane with the smallest matching error is in a passable state; where the lane with the smallest matching error is a lane where the obstacle is located.

The apparatus 500 for determining passage of the autonomous vehicle acquires the corresponding lane where the obstacle is located through the movement trajectory of the obstacle within the intersection, thereby determining the passable state of the lane.

According to some embodiments of the disclosure, the above-mentioned apparatus 500 for determining passage of the autonomous vehicle may be used to implement the method for determining passage of the autonomous vehicle described in the embodiment of FIG. 3.

Figure 6:
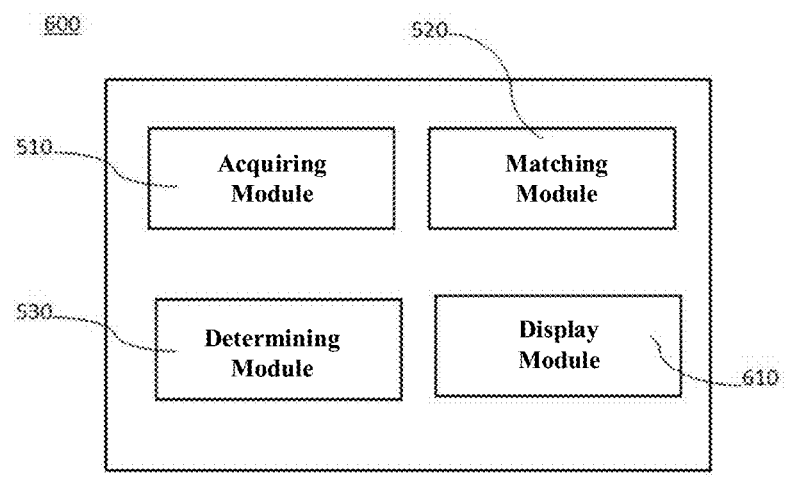
FIG. 6 schematically shows a block diagram of the apparatus for determining passage of the autonomous vehicle according to some other embodiments of the disclosure.

FIG. 6 schematically shows a block diagram of an apparatus 600 for determining passage of the autonomous vehicle according to some other embodiments of the disclosure.

As shown in FIG. 6, in addition to the acquiring module 510, the matching module 520, and the determining module 530 described in the embodiment in FIG. 5, the apparatus 600 for determining passage of the autonomous vehicle further includes a display module 610.

Specifically, the display module 610 is configured to display a determination result on the terminal after the determining module 530 completes the scan.

In the apparatus 600 for determining passage of the autonomous vehicle, the result can be visually displayed by the display module 610.

Figure 7:
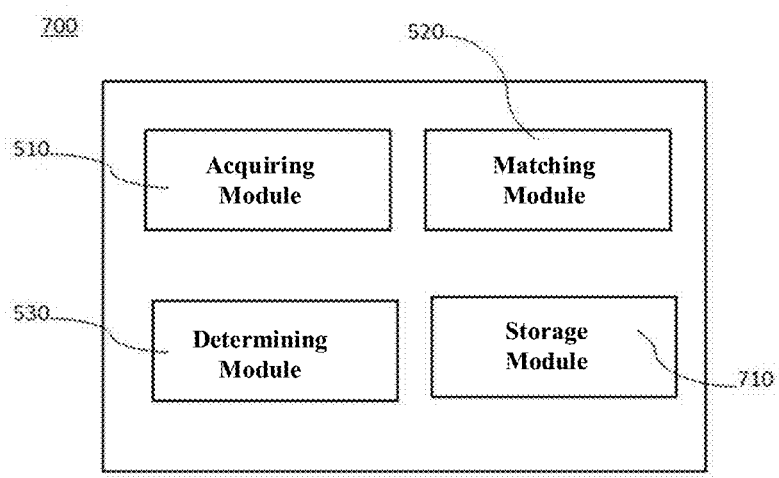
FIG. 7 schematically shows a block diagram of the apparatus for determining passage of the autonomous vehicle according to some other embodiments of the disclosure.

FIG. 7 schematically shows a block diagram of an apparatus 700 for determining passage of the autonomous vehicle according to some other embodiments of the disclosure.

As shown in FIG. 7, in addition to the acquiring module 510, the matching module 520, and the determining module 530 described in the embodiment in FIG. 5, the apparatus 700 for determining passage of the autonomous vehicle further includes a storage module 710.

Specifically, the storage module 710 is configured to store the determination result and data related to the determination process, thereby facilitating call and reference by the staff or the server.

It should be understood that the acquiring module 510, the matching module 520, the determining module 530, the display module 610, and the storage module 710 may be combined into one module for implementation, or any one of the modules may be split into multiple modules. Alternatively, at least part of the functions of one or more of these modules may be combined with at least part of the functions of other modules and implemented in one module. According to some embodiments of the disclosure, at least one of the acquiring module 510, the matching module 520, the determining module 530, the display module 610, and the storage module 710 may be at least partially implemented as a hardware circuit, such as field programmable gate array (FPGA), programming logic array (PLA), system on chip, system on substrate, system on package, application specific integrated circuit (ASIC), or may be implemented in hardware or firmware such as any other reasonable way to integrate or package the circuit, or may be implemented by an appropriate combination of three implementation modes: software, hardware, and firmware. Alternatively, at least one of the acquiring module 510, the matching module 520, the determining module 530, the display module 610, and the storage module 710 may be at least partially implemented as a computer program module, and when the program is run by a computer, the function of the corresponding module may be executed.

Since the various modules of the apparatus for determining passage of the autonomous vehicle according to the exemplary embodiments of the disclosure may be configured to implement the steps of the method for determining passage of the autonomous vehicle according to the exemplary embodiments as described in FIG. 3, those details omitted in the apparatus embodiments may refer to the implementation of the method for determining passage of the autonomous vehicle in the disclosure.

The specific implementation of each module, unit, and sub-unit in the apparatus for determining passage of the autonomous vehicle according to the embodiments of the disclosure may refer to the content in the above-mentioned method for determining passage of the autonomous vehicle as described above, which will not be repeated here.

It should be noted that although several modules, units, and subunits of the apparatus for performing operations are mentioned in the above detailed description, such division is not mandatory. In fact, according to the embodiments of the disclosure, the features and functions of two or more modules, units, and subunits described above may be embodied in one module, unit, and subunit. Conversely, the features and functions of one module, one unit, and one sub-unit described above may be further divided into multiple modules, units, and sub-units for implementation.

Through the description of the above embodiments, those skilled in the art can easily understand that the exemplary embodiments described here may be implemented by software, or may be implemented by combining software with necessary hardware. Therefore, the technical solution according to the embodiments of the disclosure can be embodied in the form of a software product, which can be stored in a non-volatile storage medium (e.g., CD-ROM, U disk, mobile hard disk, and the like) or on the network, and includes several instructions causing a computing device (e.g., a personal computer, a server, a touch terminal, a network device, and the like) to implement the method according to the embodiments of the disclosure.

Those skilled in the art will easily think of other embodiments of the disclosure after understanding the specification and practicing the disclosure disclosed herein. This application is intended to cover any variations, uses, or adaptive changes of the disclosure. These variations, uses, or adaptive changes follow the general principles of the disclosure and may include common knowledge or conventional technical means in the technical field that are not disclosed in the disclosure. The description and the embodiments are merely intended to be exemplary, and the scope and spirit of the disclosure are limited by the following claims.

It should be understood that the disclosure is not limited to the precise structure that has been described above and shown in the drawings, and various modifications and changes can be made without departing from its scope. The scope of the disclosure is only limited by the appended claims.

What is claimed is:

1. A method for determining passage of an autonomous vehicle, comprising:
   acquiring information about an intersection on a driving route of the autonomous vehicle, wherein the information about the intersection comprises lane data;
   acquiring a historical trajectory of an obstacle in the intersection within a specific time;
   acquiring, by matching the historical trajectory of the obstacle with center lines of respective lanes in the lane data, a lane with smallest matching error; and
   determining that the lane with the smallest matching error is in a passable state, wherein the lane with the smallest matching error is a lane where the obstacle is located,
   wherein the lane with smallest matching error comprises a first lane acquired based on historical trajectories of a first number of obstacles and a second lane acquired based on historical trajectories of a second number of obstacles, and the determining that the lane with the smallest matching error is in the passable state comprises:
   determining that the first lane is in the passable state and is located on a first side of the intersection;
   determining that the second lane is in the passable state and is located on a second side, different from the first side, of the intersection;
   determining, based on the first side and the second side, that a contradiction exists in response to the first lane and the second lane being unable to be in the passable state at the same time;
   performing, in response to that the contradiction exists, comparison between the first number and the second number; and
   in response to the first number being greater than the second number, confirming that the first lane is in the passable state and updating the second lane as in a non-passable state.

2. The method according to claim 1, further comprising:
   acquiring a state of a traffic light on the driving route of the autonomous vehicle;
   verifying, when the traffic light corresponding to the lane with the smallest matching error is the traffic light on the driving route of the autonomous vehicle, whether the traffic light on the driving route of the autonomous vehicle is in the passable state.

3. The method according to claim 1, wherein the acquiring the historical trajectory of the obstacle in the intersection within the specific time comprises:
   tracking historical trajectory points of the obstacle through a control algorithm, and determining an obtained tracking trajectory as the historical trajectory of the obstacle;
   wherein an interpolation is performed on the historical trajectory, and the historical trajectory comprises coordinates and orientations of respective interpolated points, and an orientation of an interpolated point is a moving direction of the obstacle.

4. The method according to claim 3, wherein the acquiring, by matching the historical trajectory of the obstacle with center lines of respective lanes in the lane data, the lane with smallest matching error comprises:
   acquiring, by matching a shape and an orientation of the historical trajectory of the obstacle with a shape and an extension direction of the center lines of respective lanes in the lane data, the lane with the smallest matching error;
   wherein an interpolation is performed on the center lines of respective lanes, and a center line of a lane comprises coordinates and orientations of respective interpolated points.

5. The method according to claim 1, wherein the acquiring, by matching the historical trajectory of the obstacle with center lines of respective lanes in the lane data, the lane with smallest matching error comprises:
   acquiring, by matching the historical trajectory of the obstacle with the center lines of respective lanes in the lane data through a curve similarity matching algorithm, the lane with the smallest matching error.

6. The method according to claim 5, wherein an interpolation is performed on the historical trajectory, and the historical trajectory comprises coordinates and orientations of respective interpolated points, and an orientation of an interpolated point is a moving direction of the obstacle; another interpolation is performed on the center lines of respective lanes, and a center line of a lane comprises coordinates and orientations of respective interpolated points; and the acquiring, by matching the historical trajectory of the obstacle with the center lines of respective lanes in the lane data through the curve similarity matching algorithm, the lane with the smallest matching error comprises:
   calculating a distance from each interpolated point of the historical trajectory to a nearest interpolated point on the center lines of respective lanes in the lane data, and calculating an orientation difference between each interpolated point of the historical trajectory and the nearest interpolated point on the center lines of respective lanes in the lane data;
   calculating a sum of absolute values of the distance and the orientation difference between the historical trajectory and the center lines of respective lanes in the lane data; and
   determining a lane with a smallest sum of the absolute values in the lane data as the lane with the smallest matching error;
   wherein, the orientation difference is an angle between an orientation of an interpolated point of the historical trajectory and an orientation of an interpolated point of a center line of a lane.

7. The method according to claim 1, wherein the information about the intersection further comprises a polygon formed by sequentially connecting cut-off lines of respective lanes, and the acquiring the historical trajectory of the obstacle in the intersection within the specific time comprises:

acquiring the historical trajectory of the obstacle in the intersection within the specific time and within the polygon.

8. An electronic device, comprising:
one or more processors; and
a memory, configured to store one or more programs, and the one or more programs are used for, when being executed by the one or more processors, causing the one or more processors to implement operations comprising:
acquiring information about an intersection on a driving route of the autonomous vehicle, wherein the information about the intersection comprises lane data;
acquiring a historical trajectory of an obstacle in the intersection within a specific time;
acquiring, by matching the historical trajectory of the obstacle with center lines of respective lanes in the lane data, a lane with smallest matching error; and
determining that the lane with the smallest matching error is in a passable state, wherein the lane with the smallest matching error is a lane where the obstacle is located, wherein the lane with smallest matching error comprises a first lane acquired based on historical trajectories of a first number of obstacles and a second lane acquired based on historical trajectories of a second number of obstacles, and the determining that the lane with the smallest matching error is in the passable state comprises:
determining that the first lane is in the passable state and is located on a first side of the intersection;
determining that the second lane is in the passable state and is located on a second side, different from the first side, of the intersection;
determining, based on the first side and the second side, that a contradiction exists in response to the first lane and the second lane being unable to be in the passable state at the same time;
performing, in response to that the contradiction exists, comparison between the first number and the second number; and
in response to the first number being greater than the second number, confirming that the first lane is in the passable state and updating the second lane as in a non-passable state.

9. A non-transitory computer-readable storage medium storing a computer program, wherein the computer program is used for, when being executed by a processor, implementing a method for determining passage of an autonomous vehicle, wherein the method comprises:
acquiring information about an intersection on a driving route of the autonomous vehicle, wherein the information about the intersection comprises lane data;
acquiring a historical trajectory of an obstacle in the intersection within a specific time;
acquiring, by matching the historical trajectory of the obstacle with center lines of respective lanes in the lane data, a lane with smallest matching error; and
determining that the lane with the smallest matching error is in a passable state, wherein the lane with the smallest matching error is a lane where the obstacle is located, wherein the lane with smallest matching error comprises a first lane acquired based on historical trajectories of a first number of obstacles and a second lane acquired based on historical trajectories of a second number of obstacles, and the determining that the lane with the smallest matching error is in the passable state comprises:
determining that the first lane is in the passable state and is located on a first side of the intersection;
determining that the second lane is in the passable state and is located on a second side, different from the first side, of the intersection;
determining, based on the first side and the second side, that a contradiction exists in response to the first lane and the second lane being unable to be in the passable state at the same time;
performing, in response to that the contradiction exists, comparison between the first number and the second number; and
in response to the first number being greater than the second number, confirming that the first lane is in the passable state and updating the second lane as in a non-passable state.

10. The electronic device according to claim 8, wherein the one or more processors are further configured to implement operations comprising:
acquiring a state of a traffic light on the driving route of the autonomous vehicle;
verifying, when the traffic light corresponding to the lane with the smallest matching error is the traffic light on the driving route of the autonomous vehicle, whether the traffic light on the driving route of the autonomous vehicle is in the passable state.

11. The electronic device according to claim 8, wherein the acquiring the historical trajectory of the obstacle in the intersection within the specific time comprises:
tracking historical trajectory points of the obstacle through a control algorithm, and determining an obtained tracking trajectory as the historical trajectory of the obstacle;
wherein an interpolation is performed on the historical trajectory, and the historical trajectory comprises coordinates and orientations of respective interpolated points, and an orientation of an interpolated point is a moving direction of the obstacle.

12. The electronic device according to claim 11, wherein the acquiring, by matching the historical trajectory of the obstacle with center lines of respective lanes in the lane data, the lane with smallest matching error comprises:
acquiring, by matching a shape and an orientation of the historical trajectory of the obstacle with a shape and an extension direction of the center lines of respective lanes in the lane data, the lane with the smallest matching error;
wherein an interpolation is performed on the center lines of respective lanes, and a center line of a lane comprises coordinates and orientations of respective interpolated points.

13. The electronic device according to claim 8, wherein the acquiring, by matching the historical trajectory of the obstacle with center lines of respective lanes in the lane data, the lane with smallest matching error comprises:
acquiring, by matching the historical trajectory of the obstacle with the center lines of respective lanes in the lane data through a curve similarity matching algorithm, the lane with the smallest matching error.

14. The electronic device according to claim 13, wherein an interpolation is performed on the historical trajectory, and the historical trajectory comprises coordinates and orientations of respective interpolated points, and an orientation of an interpolated point is a moving direction of the obstacle; another interpolation is performed on the center lines of respective lanes, and a center line of a lane comprises coordinates and orientations of respective interpolated points; and the acquiring, by matching the historical trajectory of the obstacle with the center lines of respective lanes in the lane data through the curve similarity matching algorithm, the lane with the smallest matching error comprises:

calculating a distance from each interpolated point of the historical trajectory to a nearest interpolated point on the center lines of respective lanes in the lane data, and calculating an orientation difference between each interpolated point of the historical trajectory and the nearest interpolated point on the center lines of respective lanes in the lane data;

calculating a sum of absolute values of the distance and the orientation difference between the historical trajectory and the center lines of respective lanes in the lane data; and determining a lane with a smallest sum of the absolute values in the lane data as the lane with the smallest matching error;

wherein, the orientation difference is an angle between an orientation of an interpolated point of the historical trajectory and an orientation of an interpolated point of a center line of a lane.

15. The electronic device according to claim 8, wherein the information about the intersection further comprises a polygon formed by sequentially connecting cut-off lines of respective lanes, and the acquiring the historical trajectory of the obstacle in the intersection within the specific time comprises:

acquiring the historical trajectory of the obstacle in the intersection within the specific time and within the polygon.

\* \* \* \* \*